Aug. 21, 1962 W. C. MOELLER 3,049,973
NOSE PAD FOR SPECTACLES
Filed May 5, 1955

INVENTOR.
William C. Moeller
BY
ATTORNEY.

United States Patent Office 3,049,973
Patented Aug. 21, 1962

3,049,973
NOSE PAD FOR SPECTACLES
William C. Moeller, Kansas City, Mo., assignor to Parmelee Plastics Company, Kansas City, Mo., a corporation of Missouri
Filed May 5, 1955, Ser. No. 506,159
2 Claims. (Cl. 88—48)

This invention relates to improvements in spectacles, eye shields, goggles, or other eye-protecting devices, and particularly to an improved nose pad, the primary object being to provide a pad that is not only readily replaceable, but one that is inexpensive and exceptionally comfortable to the wearer of the eye device.

It is the most important object of the present invention to provide a nose pad having a pocket on the back face thereof adapted to receive a bracket extending laterally from the spectacles and to engage the bracket in a manner to permit replacement of the pad as may become necessary or desired, yet capable of attaching the pad to the bracket in a manner to prevent accidental displacement thereof.

Another important object of the present invention is to provide a nose pad of the aforementioned character and including a pair of opposed, flexible projections within the pocket that extend into a perforation within the bracket so that the pad may be readily and quickly slipped into place upon the bracket.

A further object of the present invention is to improve upon nose-engaging pads of the aforementioned character by providing a concave nose-engaging face therefor, which more adequately conforms to the shape of the nose of the wearer.

Figure 1:
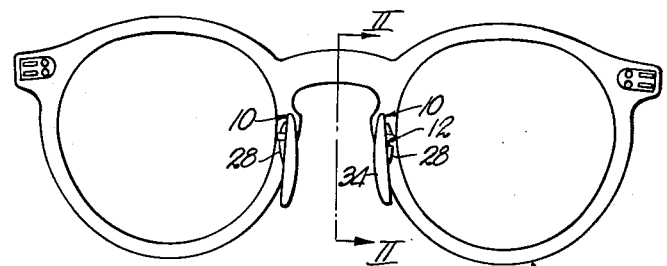
FIGURE 1 is an inside elevational view of a pair of spectacles showing nose pads mounted thereon and made according to the principles of the instant invention.
Figure 2:
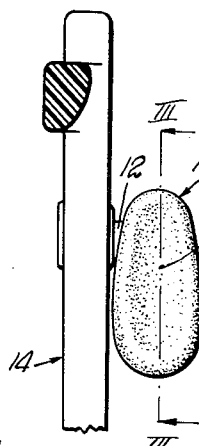
FIG. 2 is an enlarged, cross-sectional view taken on line II—II of FIG. 1.
Figures 3, 4:
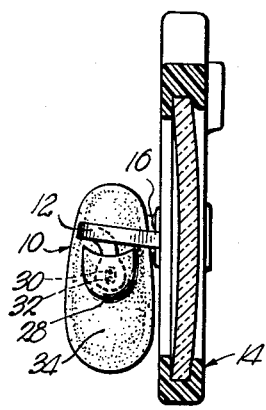
FIG. 3 is a transverse, cross-sectional view taken on line III—III of FIG. 2.
FIG. 4 is a cross-sectional view through the spectacles and illustrating the back face of one of the improved nose pads.

While nose pad 10, made according to the form of my invention illustrated in FIGS. 1 to 4 inclusive, may be molded, stamped or otherwise formed from any suitable material, it is to be preferred that the same be appreciably more pliable and flexible than has heretofore been true of conventional pads and, therefore, relatively lightweight plastic substances are suggested.

Pad 10 is particularly adapted for mounting upon a bracket 12 secured to spectacle frame 14 in the usual manner through use of rivets or the like 16. Bracket 12 has a rearwardly extending leg 18 provided with integral oppositely extending ears 20 at one end thereof for receiving rivets 16. A downturned leg 22 integral with the opposite end of the leg 18 has a head 24 on the lowermost end thereof which is in turn provided with an elongated perforation 26.

Pad 10 is provided with an open top pocket 28 on the back face thereof adapted to receive the head 24 and when the head 24 is within the pocket 28, the elongated perforation 26 thereof receives a pair of oppositely extending, flexible projections 30 and 32 within the pocket 28. The projections 30 and 32 are relatively offset one above the other so that when the same are disposed in perforation 26, the pad 10 is held against unlimited rotative movement with respect to the bracket 12.

Through such construction, the pad 10 may be readily and quickly slipped into place upon the bracket 12 since the flexible projections 30 and 32 readily yield to the pressure by head 24 until the projections 30 and 32 snap into the perforation 26. The projections 30 and 32, as well as the pocket 28, permit a substantial amount of movement of the pad 10 in all directions so as to cause the latter to conform to the shape and configuration of the nose of the wearer, yet are fully capable of maintaining the pad 10 attached to the bracket 12 until such time as the user may wish to remove the same.

While nose pads have generally been provided with convex nose-engaging faces, it is to be preferred that the nose-engaging face 34 of pad 10 be transversely concave so that the pressure is more evenly distributed, and inasmuch as the human nose is either flat or convex from front to back, the pad 10 will provide a better fit than is true of conventional supports of this character. Longitudinally, the pad 10 may be either flat or slightly convex, as desired.

Figure 5:
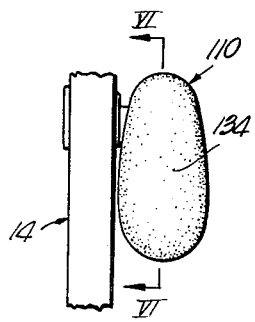
FIG. 5 is a view similar to FIG. 2 illustrating the modified form of nose pad made pursuant to the principles of the instant invention.
Figure 6:
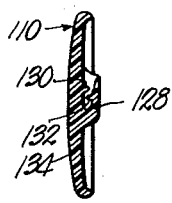
FIG. 6 is a cross-sectional view taken on line VI—VI of FIG. 5.
Figure 7:
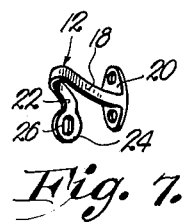
FIG. 7 is a perspective view of one form of mounting bracket with which the nose pad of the present invention is adapted to be used.

Pad 110 shown in FIGS. 5 and 6 of the drawing, is of the same general character as pad 10 except that the nose-engaging face 134 thereof is both longitudinally and transversely convex. Pocket 128 is open at the top and formed on the back concave face of the pad 110 as seen in FIG. 6.

Oppositely extending, relatively offset projections 130 and 132 within the pocket 128, receive elongated perforation 26 of head 24 in the same manner as above described with respect to pad 10.

Having thus described the invention what is claimed as new and desired to be secured by Letters Patent is:

1. In combination with a perforated bracket adapted for mounting on a pair of spectacles, a nose pad having a back face provided with a bracket-receiving pocket; and a pair of opposed projections in the pocket received by the perforation of the bracket for attaching the pad to the bracket, said perforation being elongated, the projections being relatively offset to hold the pad against rotation on the bracket.

2. In combination with a bracket having an elongated perforation therein and adapted for mounting on a pair of spectacles, a one-piece, pliable nose pad entirely formed of pliable material having a back face provided with integral structure presenting a bracket-receiving pocket, and a pair of generally opposed, resilient projections respectively integral with the back face of the pad and the structure extending into the pocket and releasably received by the perforation of the bracket for attaching the pad to the bracket, said projections being relatively offset from each other longitudinally of the perforation to hold the pad against rotation on the bracket.

References Cited in the file of this patent
UNITED STATES PATENTS

| | | |
|---|---|---|
| 675,595 | Gehring | June 4, 1901 |
| 1,017,579 | Nicol | Feb. 13, 1912 |
| 2,051,996 | Lee | Aug. 25, 1936 |
| 2,080,847 | Bouchard | May 18, 1937 |
| 2,147,802 | Scharfeld | Feb. 21, 1939 |
| 2,257,966 | Krapp | Oct. 7, 1941 |
| 2,629,284 | Nerney | Feb. 24, 1953 |
| 2,677,988 | Belgard | May 11, 1954 |

FOREIGN PATENTS

| | | |
|---|---|---|
| 307,246 | Great Britain | Mar. 7, 1929 |